(12) United States Patent
Azriel

(10) Patent No.: US 6,724,736 B1
(45) Date of Patent: Apr. 20, 2004

(54) REMOTE ECHO CANCELLATION IN A PACKET BASED NETWORK

(75) Inventor: Gad Azriel, Holon (IL)

(73) Assignee: 3Com Corporation, Santa Clara, CA (US)

(*) Notice: Subject to any disclaimer, the term of this patent is extended or adjusted under 35 U.S.C. 154(b) by 0 days.

(21) Appl. No.: 09/570,333

(22) Filed: May 12, 2000

(51) Int. Cl.[7] ................................................ H04B 3/20
(52) U.S. Cl. ........................................................ 370/286
(58) Field of Search .............................. 370/286, 289, 370/290; 379/406.01, 406.02, 406.04, 406.05, 406.08, 406.09

(56) References Cited

U.S. PATENT DOCUMENTS 6,324,170 B1 * 11/2001 McClennon et al. ........ 370/286
6,580,696 B1 * 6/2003 Chen et al.

OTHER PUBLICATIONS

The IETF Internet Telephony Architecture and Protocols (Henning Schulzrinne Dept. of Computer Science Columbia University—Mar. 18, 1999).*

International Telecommunication Union, H.225.0, Annex A, RTP/RTCP, Feb. 1998, pp. 73–106.

International Telecommunication Union, H.323, Draft v4, Aug. 1999, Chapters 6 & 7, pp. 13–52.

Packet Telephony Primer, 3COM Corporation, Mar. 1998.

* cited by examiner

*Primary Examiner*—Chau Nguyen
*Assistant Examiner*—Mehdi Emdadi
(74) *Attorney, Agent, or Firm*—Howard Zaretsky

(57) ABSTRACT

An apparatus for and a method of remote echo cancellation in a packet based telephony system. Echo cancellation algorithms normally performed on the local end of a connection, are performed instead by the remote end of the connection. Alternatively, the echo cancellation algorithms are performed for both the local and remote ends of a connection on a remote device. In the former case, the remote endpoint estimates the echo function of the local endpoint using audio and timing synchronization data corresponding to the actual audio played at the local endpoint. Using this information, the remote endpoint is able to accurately perform echo cancellation.

23 Claims, 9 Drawing Sheets

REMOTE ECHO CANCELLATION IN A PACKET BASED NETWORK

FIELD OF THE INVENTION

The present invention relates generally to voice over IP networks and more particularly relates to an apparatus and method of performing remote echo cancellation for the local endpoint of a connection.

BACKGROUND OF THE INVENTION

Separate Voice and Data Networks

Currently, there is a growing trend to converge voice and data networks so that both utilize the same network infrastructure. The currently available systems that combine voice and data have limited applications and scope. An example is Automatic Call Distribution (ACD), which permits service agents in call centers to access customer files in conjunction with incoming telephone calls. ACD centers, however, remain costly and difficult to deploy, requiring custom systems integration in most cases. Another example is the voice logging/auditing system used by emergency call centers (e.g., 911) and financial institutions. Deployment has been limited due to the limited scalability of the system since voice is on one network and data is on another, both tied together by awkward database linkages.

The aim of IP telephony is to provision voice over IP based networks in both the local area network (LAN) and the wide area network (WAN). Currently, voice and data generally flow over separate networks, the goal is to transmit them both over a single medium and on a single network.

A block diagram illustrating example separate prior art data and voice networks is shown in FIG. 1. The LAN portion, generally referenced 10, comprises the LAN cabling infrastructure, routers, switches and gateways 12 and one or more network devices connected to the LAN. Examples of typical network devices include servers 14, workstations 16 and printers (not shown). The voice portion, generally referenced 20, has at its core a private branch exchange (PBX) 24 which comprises one or more trunk line interfaces and one or more telephone and/or facsimile extension interfaces. The PBX is connected to the public switched telephone network (PSTN) 22 via one or more trunk lines 28, e.g., analog T1, E1, T3, ISDN, etc. A plurality of user telephones 26 and one or more facsimile machines 27 are also connected directly to the PBX via phone line extensions 29.

The paradigm currently in wide spread use consists of circuit switched fabric 20 for voice networks and a completely separate LAN infrastructure 10 for data. Most enterprises today use proprietary PBX equipment for voice traffic.

Voice and Data Over a Shared Network

An increasingly common IP telephony paradigm consists of telephone and data tightly coupled on IP packet based, switched, multimedia networks where voice and data share a common transport mechanism. It is expected that this paradigm will spur the development of a wealth of new applications that take advantage of the simultaneous delivery of voice and data over a single unified fabric.

A block diagram illustrating a voice over an IP network where voice and data share a common infrastructure is shown in FIG. 2. The IP telephony system, generally referenced 30, comprises, a LAN infrastructure represented by an Ethernet switch 32, a router, one or more telephones 36, workstations 34, a gateway 42, a gatekeeper 46, a PBX 33 with a LAN interface port and a Layer 3 switch 38. The key components of an IP telephony system 30 are the modified desktop, gatekeeper and gateway entities. For the desktop, users may have an Ethernet phone 36 that plugs into an Ethernet RJ-45 jack or a handset or headset 35 that plugs into a PC 37.

Today, all LAN based telephony systems need to connect to the PSTN 44. The gateway is the entity that is specifically designed to convert voice from the IP domain to the PSTN domain. The gatekeeper is primarily the IP telephony equivalent of the PBX in the PSTN world.

Typically, the IP telephony traffic is supported by a packet-based infrastructure such as an Ethernet network but a circuit-based infrastructure can be used as well with some provisions (e.g., ATM LAN emulation on ATM networks). Telephony calls traversing the intranet may pass through a Layer 3 switch 38 or a router (not shown) connecting a corporate intranet 40. The Layer 3 switch and the router should support Quality of Service (QoS) features such as IEEE 802.1p and 802.1Q and Resource Reservation Protocol (RSVP).

ITU-T Recommendation H.323

The International Telecommunications Union (ITU-T) Telecommunications Standardization Sector has issued a number of standards related to telecommunications. The Series H standards deals with audiovisual and multimedia systems and describes standards for systems and terminal equipment for audiovisual services. The H.323 standard is an umbrella standard that covers various audio and video encoding standards. Related standards include H.225.0 that covers media stream packetization and call signaling protocols and H.245 that covers audio and video capability exchange, management of logical channels and transport of control and indication signals. Details describing these standards can be found in ITU-T Recommendation H.323 (Draft 4 August 1999), ITU-T Recommendation H.225.0 (February 1998) and ITU-T Recommendation H.245 (Jun. 3, 1999).

A block diagram illustrating example prior art H.323 compliant terminal equipment is shown in FIG. 3. The H.323 terminal 50 comprises a video codec 52, audio codec 54, system control 56 and H.225.0 layer 64. The system control comprises H.245 control 58, call control 60 and Registration, Admission and Status (RAS) control 62.

Attached video equipment 66 includes any type of video equipment, such as cameras and monitors including their control and selection, and various video processing equipment. Attached audio equipment 70 includes devices such as those providing voice activation sensing, microphones, loudspeakers, telephone instruments and microphone mixers. Data applications and associated user interfaces 72 such as those that use the T.120 real time audiographics conferencing standard or other data services over the data channel. The attached system control and user interface 74 provides the human user interface for system control. The network interface 68 provides the interface to the IP based network.

The video codec 52 functions to encode video signals from the video source (e.g., video camera) for transmission over the network and to decode the received video data for output to a video display. If a terminal incorporates video communications, it must be capable of encoding and decoding video information in accordance with H.261. A terminal may also optionally support encoding and decoding video in accordance with other recommendations such as H.263.

The audio codec 54 functions to encode audio signals from the audio source (e.g., microphone) for transmission over the network and to decode the received audio data for output to a loudspeaker. All H.323 audio terminals must be capable of encoding and decoding speech in accordance with G.711 including both A-law and $\mu$-law encoding. Other types of audio that may be supported include G.722, G.723, G.728 and G.729.

The data channel supports telematic application such as electronic whiteboards, still image transfer, file exchange, database access, real time audiographics conferencing (T.120), etc. The system control unit 56 provides services as defined in the H.245 and H.225.0 standards. For example, the system control unit provides signaling for proper operation of the H.323 terminal, call control, capability exchange, signaling of commands and indications and messaging to describe the content of logical channels. The H.225.0 Layer 64 is operative to format the transmitted video, audio, data and control streams into messages for output to the network interface. It also functions to retrieve the received video, audio, data and control steams from messages received from the network interface 68.

The gateway functions to convert voice from the IP domain to the PSTN domain. In particular, it converts IP packetized voice to a format that can be accepted by the PSTN. The actual format depends of the type of media and protocol used for connecting to the PSTN (e.g., T1, E1, ISDN BRI, ISDN PRI, analog lines, etc.). The gateway provides the appropriate translation between different video, audio and data transmission formats and between different communications procedures and medias.

Note that since the digitization format for voice on the IP packet network is often diferent than on the PSTN, the gateway needs to provide this type of conversion which is known as transcoding. Note also that gateway also function to pass singaling information such as dial tone, busy tone etc. Typical connections supported by the gateway include analog, T1, E1, ISDN, frame relay and ATM at OC-3and higher rates. Additional function performed by the gateway include call setup and clearing on both the network side and the PSTN side. The gateway may be omitted if communication with the PSTN is not required.

The gatekeeper functions to provide call control services, address translation services, call routing services, call authorization services, billing, bandwidth management and telephony supplementary services like call forwarding and call transfer to terminal endpoints on the network. It is primarily designed to be the IP telephony equivalent of the PBX. Logical endpoints register themselves with the gatekeeper before attempting to bring up a session. The gatekeeper may deny a request to bring up a session or may grant the request at a reduced data rate. This is particularly relevant to video connections that typically consume huge amounts of bandwidth for a high quality connection.

Call control signaling is optional as the gatekeeper may choose to complete the call signaling with the H.323 endpoints and process the call signaling or it may direct the endpoints to connect to the call signaling channel directly, the gatekeeper thus avoiding handling the H.225.0 call control signals.

Through the use of H.225.0 signaling, the gatekeeper may reject calls from a terminal due to authorization failure. The reasons for rejection may include restricted access to or from particular terminals or gateways, or restricted access during certain time periods.

Bandwidth management entails controlling the number of H.323 terminals that are allowed to simultaneously access the network. Via H.225.0 signaling, the gatekeeper may reject calls from a terminal due to bandwidth limitations. This may occur if the gatekeeper determines that there is insufficient bandwidth available on the network to support the call.

The call management function performed by the gatekeeper includes maintaining a list of currently active H.323 calls. This information is used to indicate that a terminal is busy and to provide information for the bandwidth management function.

The gatekeeper also provides address translation whereby an alias address is translated to a Transport Address. This is performed using a translation table that is updated using Registration messages, for example.

Real-Time Transport Protocol

The H.225.0 standard dictates the usage of the Real-time Transport Protocol (RTP) which is defined by the IETF in RFC 1889 for conveying data between the call endpoints and for monitoring the network congestion. The RTP protocol defines the RTP packet structure that includes two parts: the RTP packet header part and the RTP packet payload part. The RTP packet header includes several fields. Among those fields, are the payload type identification field, the sequence numbering field and the time stamping field. Typically, applications encapsulate RTP in a UDP packet. UDP/IP is an unreliable transport mechanism and therefore there is no guarantee that the RTP packet would reach its destination. RTP may, however, be used with other suitable underlying network or transport protocols.

RTP does not itself provide any mechanism to ensure timely delivery or other QoS guarantees, but relies on lower layer services to do so. It also does not guarantee delivery, nor does it assume that the underlying network is reliable and delivers packets in sequence. RTP includes sequence numbers and timestamps in the packet to allow the receiver to reconstruct the sender's packet sequence and timing.

RTP is intended to be flexible so as to provide the information required by a particular application. Unlike conventional protocols in which additional functions may be accommodated by making the protocol more general or by adding an option mechanism that requires parsing, RTP can he tailored through modifications and/or additions to the headers.

The RTP Control Protocol (RTCP) functions to periodically transmit control packets to all participants in a session. The primary function of RTCP is to provide feedback on the quality of the data distribution that is useful for monitoring network congestion. The RTCP protocol is designed to monitor the quality of service and to convey information about the participants in an on-going session. RTCP also carries a transport level identifier for an RTP source called the canonical name or CNAME. Receivers requite the CNAME to associate multiple data streams from a given participant in a set of related RTP sessions. The RTCP protocol can also be used to convey session control information such as participant identification. Each RTCP packet begins with a fixed header followed by structured elements of variable length. Note that the signaling/control information carried in the RTCP packets is transmitted using the TCP/IP reliable protocol.

Also under the H.323 protocol umbrella are a number of standards for voice codecs including for example, G.711, G.729, G.729.1 and G.723.1.

Call Signaling

Call signaling encompasses the messages and procedures used to establish a call, request changes in bandwidth of the call, get status of the endpoints in the call and disconnect the call. Call signaling uses messages defined in the H.225.0 standard. In particular, the RAS signaling function uses H.225.0 messages to perform registration, admissions, bandwidth changes, status and disengage procedures between endpoints and Gatekeepers. The RAS Signaling Channel is independent from the Call Signaling Channel and the H.245 Control Channel.

Each H.323 entity has at least one network address that uniquely identifies the H.323 entity on the network. For each network address, each H.323 entity may have several TSAP identifiers that enable the multiplexing or several channels sharing the same network address. Endpoints have one well-known TSAP identifier known as the Call Signaling Channel TSAP Identifier. In addition, Gatekeepers also have one well-known TSAP identifier defined as the RAS Channel TSAP Identifier, and one well-known multicast address defined as the Discovery Multicast Address. Endpoints and H.323 entities use dynamic TSAP Identifiers for the H.245 Control Channel, Audio Channels, Video Channels, and Data Channels while the Gatekeeper uses a dynamic TSAP Identifier for Call Signaling Channels.

Further, an endpoint may have one or more alias addresses associated with it. An alias address represents the endpoint and provides an alternate method of addressing the endpoint. It is important to note that an endpoint may have more than one alias address that translates to the same TSAP. The alias may comprise, for example, private telephone numbers, E.164 numbers, any alphanumeric string that may represent a name, e-mail address, etc. In addition, the alias may comprise a MAC address, IP address, ATM address, access token, DNS address, TSAP as IP address concatenated with a port number or name alias. Note that alias addresses are unique within a zone and that gatekeepers do not have alias addresses.

When there is a Gatekeeper in the network, the calling endpoint addresses the called endpoint by its Call Signaling Channel Transport Address or by its alias address. The Gatekeeper translates the latter into a Call Signaling Channel Transport Address.

An endpoint joins a zone via the registration process whereby it informs the Gatekeeper of its Transport Addresses and one or more associated alias addresses. Note that registration must take place before any calls are attempted. When endpoints are powered up, they look on the network for the Gatekeeper and once found, they register their TSAP and one or more aliases with therewith.

Echo Cancellation

In LAN Telephony applications, the voice samples generated are packed within RTP packets that are then encapsulated within UDP/IP packets. The UDP packets that travel over an IP network may, however, be delayed, dropped or arrive out or order from their original transmission sequence depending on the degree of network congestion. Therefore, the frequency in which the packets arrive at the receive side is not constant.

In order to combat the variable delay problems, many devices implement a jitter buffet on the receive side. If packets are only delayed within the network, arriving at the receiver before the jitter buffer underflows, the receive side will hear the sound as it was original transmitted by the local endpoint. If, however, packets are dropped or packets are delayed too much and the jitter buffer underflows (i.e. becomes empty), the receiving device either (1) replays the last packet received or (2) it injects a silence.

Thus, in the event packets are dropped or are delayed excessively causing jitter buffer underflow, the sound that is played on the receive side is not the original sound that was transmitted.

As in most voice communication devices, e.g., telephone, etc., a portion of the voice that is played on the receive side is returned to the transmitting side as an undesirable echo by the transmitter portion of the device. There are several sources that cause this undesirable phenomenon. The first source is the acoustic echo made up of sound waves produced by the loudspeaker that are reflected by the room walls and other objects in the room towards the microphone that records them. Another source of echo is the magnetic flux effects of the hybrid circuit in the telephone set and at the Central Office (CO). A 4 to 2 line hybrid is located in the telephone set to merge both transmit and receive directions onto a single copper pair wire. A corresponding 2 to 4 line hybrid is located at the CO to convert the single line into separate transmit and receive circuits. The magnetic flux of the receive circuitry passes through the transmit circuit coils thus causing the transmit circuit to record what is played on the receive circuit.

Some echo or feedback is desirable, however, such as when speaking on the telephone and the speaker heats her/his own voice through the handset. In this case, a small portion of the voice from the microphone is intentionally fed back to the speaker element. This intentional echo is injected locally from the microphone towards the speaker and is never sent lo the remote side.

In communication systems adapted to transfer voice, the quality of the voice is sensitive, among other things, to the round trip delay. If the round trip delay is less then 300 ms, the returned echo will not be bothersome to users. If, however, the round trip delay is greater than approximately 300 ms, the returned echo becomes noticeable to most users. In the IP telephony world there exist several sources that contribute to the round trip delay. First, each end point collects several samples until it fills an RTP packet, thus delaying the first samples. The packet is then encapsulated within a UDP/IP/Ethernet packet (und is sent over the network. The packet traverses through the network passing through one or more routers and switches, where each hop adds to the overall delay. Finally, it arrives at the remote endpoint where it is delayed in a jitter buffer until it is played. At the remote endpoint, the played sample returns as an echo with the voice that is now recorded. The round trip delay is twice the time it took from the time the sample is recorded until it is played at the remote end.

Each endpoint must, therefore, be adapted to remove this echo if the round trip delay is more then 300 ms. The echo is always removed locally whereby each end of a connection is adapted to subtract the echo from the signal it transmits Lo the other side. In the IP telephony world the echo must be removed locally, since the echo is generated from the sound that is played which may be different from the sound that was originally transmitted. Thus, each endpoint must incorporate the necessary means for removing the echo.

Typically, an endptoint incorporates one or more specialized powerful processors such as digital signal processors (DSPs) to perform the echo cancellation. A disadvantage is that these processors and their associated circuitry are costly thus increasing the resultant cost and design complexity of any device incorporating them.

SUMMARY OF THE INVENTION

The present invention provides an apparatus for and a method of remote echo cancellation in packet based telephony systems. Using the present invention, one or both endpoints in a connection do not need to perform the complex and processor intensive task of echo cancellalion. Utilizing the present invention the remote end of a connection is adapted to perform echo cancellation algorithms for both itself and the endpoint at the other end of the connection. Alternatively, a third party device serving as a transit point for the RTP packet stream can be adapted to perform the method of the present invention for one or both endpoints.

The remote endpoint (or third party device) is provided knowledge of the actual audio played on the other side (or local side) and a means for synchronizing this audio stream to the audio stream that was concurrently recorded by the local endpoint. The remote endpoint must know what was played at the local endpoint in order to accurately cancel the echo from the audio samples generated and sent by the local endpoint. The remote endpoint must estimate the echo function on the local endpoint.

To perform echo cancellation, the remote endpoint needs to know, for each data sample recorded by the local endpoint, what data sample from the remote endpoint the local endpoint played at that moment in time. In addition, the remote endpoint needs to know the several data samples that preceded the recorded data sample. The remote endpoint (or third party) is provided knowledge of the audio played on the local end of the connection via information transmitted in the header and header extension portions of the RTP packets and via the knowledge or the number of samples in the payload part of the RTP packet. There are two methods by which the local endpoint can notify the remote endpoint about which remote endpoint samples were played when the samples in the data packet were recorded: the first method is by using timestamps and the second method is by using RTP packet sequence numbers and offset pointers into the RTP packets.

In the timestamp method, the other endpoint (i.e. the local endpoint) is adapted to include the timestamp of the packet of audio that is played, with the packet of data samples sent to the remote endpoint. Thus, two timestamps are sent in the RTP packet including (1) a first timestamp of the data samples generated by the local endpoint (this timestamp value is taken when the first sample in the packet is taken) and (2) a second timestamp of the packet received from the remote endpoint and played at a point in time when the first sample of the local endpoint packet is generated.

The local endpoint is operative to track the timestamp of the data samples received encapsulated in RTP packets sent from the remote endpoint. These data samples are subsequently played by the local endpoint through its associated speaker. The data samples generated by the local endpoint are timestamped and placed in RTP packets. In addition, the timestamp of the data samples played by the local endpoint at that moment in time is also placed in the extension portion of the header of the RTP packet sent to the remote endpoint.

If the last packet received was replayed, an indication is placed in the header. extension of the packet that comprises the timestamp of the most recently received RTP packet. If a silence is played, a zero is placed in the header extension. The completed RTP packet is then sent to the remote endpoint.

The timestamp from the header extension portion of the RTP packets received from the local endpoint is extracted. A timestamp equal to zero indicates that a silence was played at the local endpoint. If the timestamp extracted is equal to the previous timestamp sent by the local endpoint, then this indicates that the local endpoint replayed the last received packet.

Otherwise, the timestamp extracted from the header extension is the timestamp of the packet that was played on the local endpoint at a point in time corresponding to the timestamp of the data samples sent in the packet. Assuming the remote endpoint has an estimate of the echo function on the local endpoint, the remote endpoint perform echo cancellation using its knowledge of the data samples played on the local endpoint. The remote endpoint is adapted maintain a copy of the most recent packets sent to the local endpoint. Since it maintains a copy of the packets, only the timestamp need be sent from the local endpoint to uniquely identify a particular packet.

The sequence method is similar to the timestamp method with the difference being that endpoint A places the sequence number and the offset within the packet that was received from endpoint B and played at the time when the first sample of the RTP packet being built is taken. This is in place of sending a timestamp.

There is therefore provided in accordance with the present invention a method of performing echo cancellation on a remote device in a packet telephony system, the system supporting a connection between a first endpoint and a second endpoint, the method comprising the steps of tracking a second timestamp of data samples originating from the second endpoint that are played by the first endpoint, generating data samples on the first endpoint, sending to the remote device packets containing data samples generated by the first endpoint, a first timestamp corresponding thereto and the second timestamp of data samples from the second endpoint played by the first endpoint at that moment in time, placing an indication in the packet of data samples sent to the remote device, the indication operative to specify whether a packet, several packets, several sequential samples from the same packet or several sequential samples from different packets received by the first endpoint were replayed or that a silence was played, tracking the number of data samples in the packets received by the remote device and reconstructing on the remote device the signal played on the first endpoint using the first timestamp, the second timestamp, the number of samples in the packet, and the indication information and performing echo cancellation therewith.

There is also provided in accordance with the present invention an apparatus for performing echo cancellation on a remote device in a packet telephony system, the system supporting a connection between a first endpoint and a second endpoint comprising means for tracking a second timestamp of data samples originating from the second endpoint that are played by the first endpoint, means for generating data samples on the first endpoint, means for sending to the remote device packets containing data samples generated by the first endpoint, a first timestamp corresponding thereto and the second timestamp of data samples from the second endpoint played by the first endpoint at that moment in time, means for placing an indication in the packet of data samples sent to the remote device, the indication operative to specify whether a packet, several packets, several sequential samples from the same packet or several sequential samples from different packets received by the first endpoint were replayed or that a silence was played, means for tracking the number of data samples in the packets received by the remote device and means for reconstructing on the remote device the signal played on the first endpoint using the first timestamp, the second timestamp, the number of samples in the packet, and the indication information and performing echo cancellation therewith.

BRIEF DESCRIPTION OF THE DRAWINGS

The invention is herein described, by way of example only, with reference to the accompanying drawings, wherein.

DETAILED DESCRIPTION OF THE INVENTION

Notation Used Throughout

Figure 1:
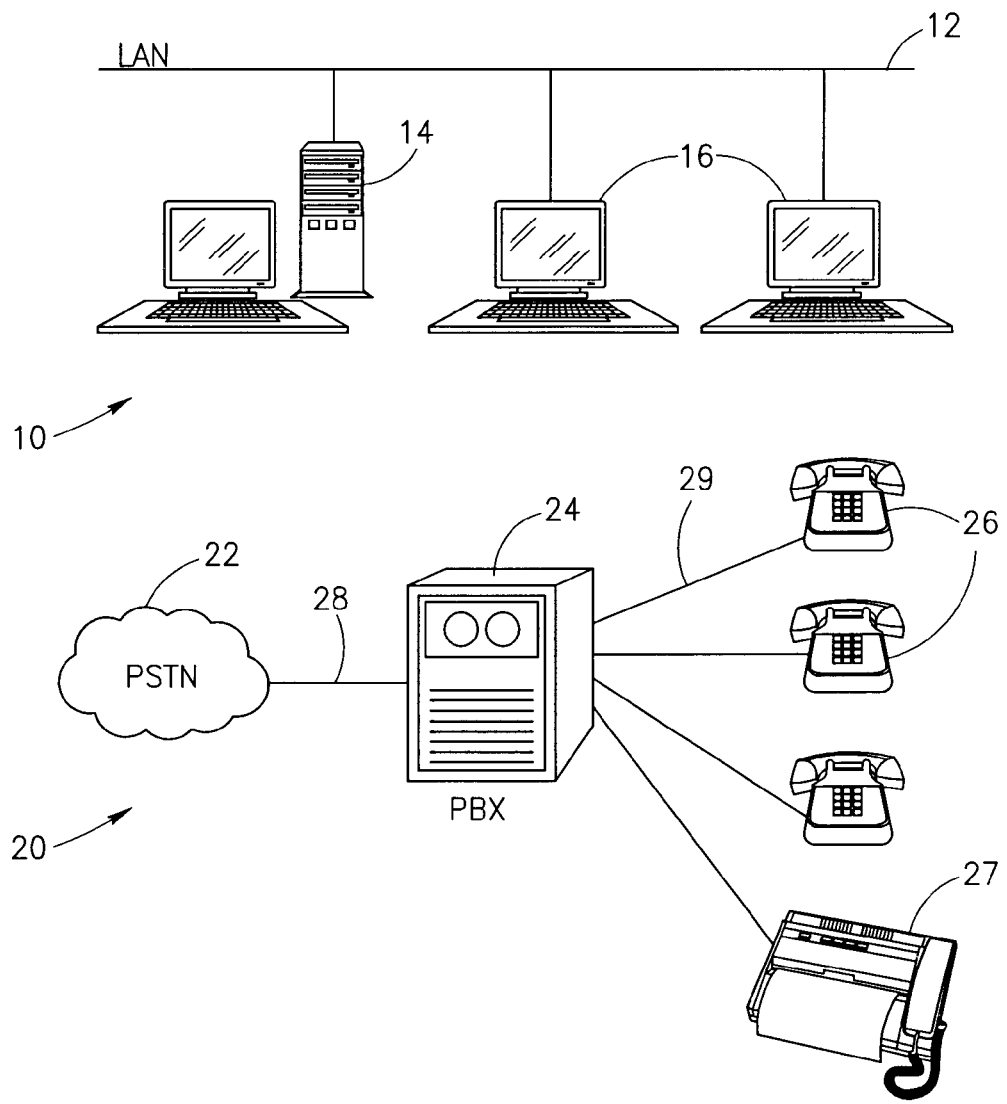
FIG. 1 is a block diagram illustrating example separate prior art data and voice networks.
Figure 2:
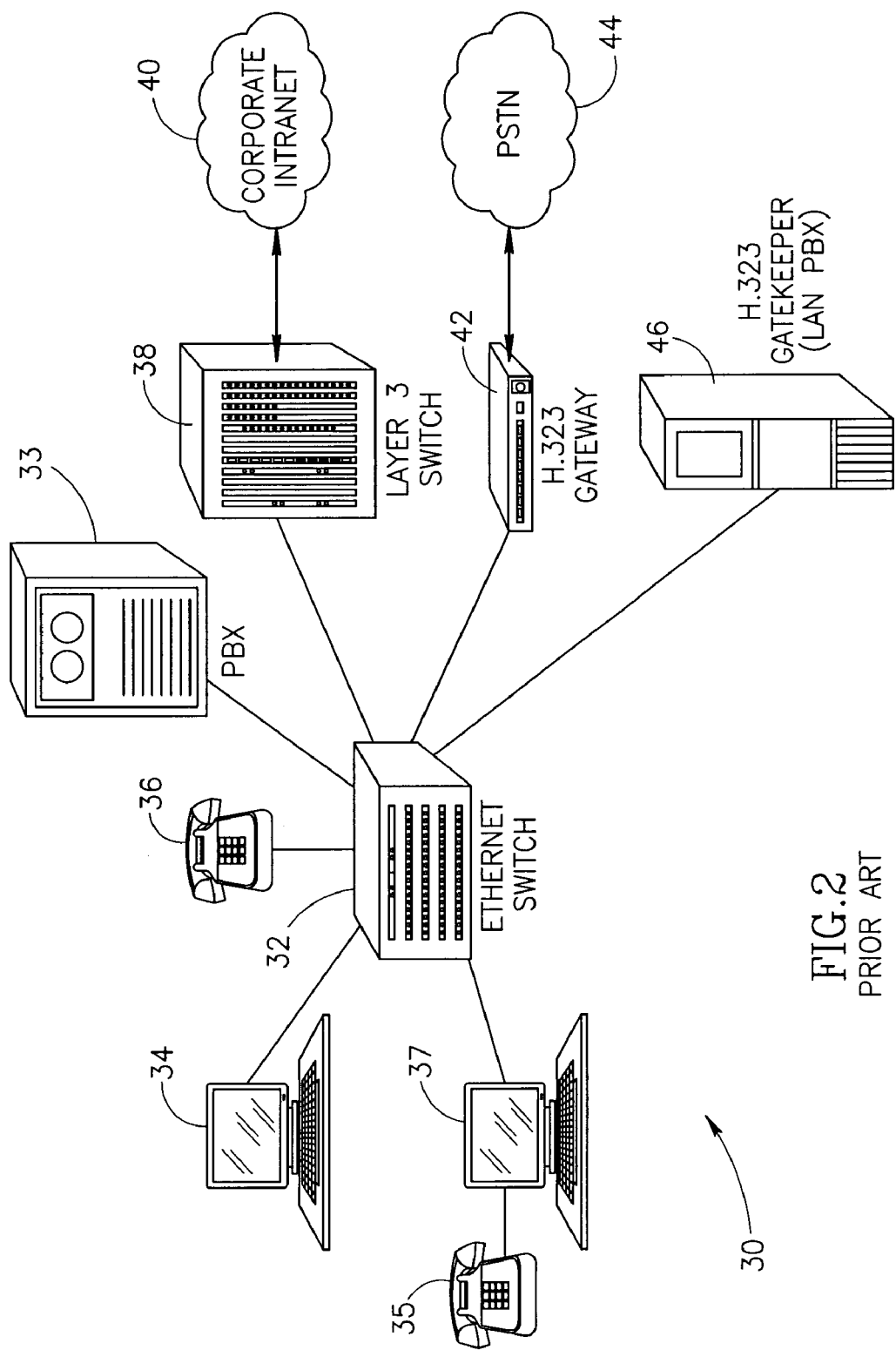
FIG. 2 is a block diagram illustrating a voice over packet network where voice and data share a common infrastructure.
Figure 3:
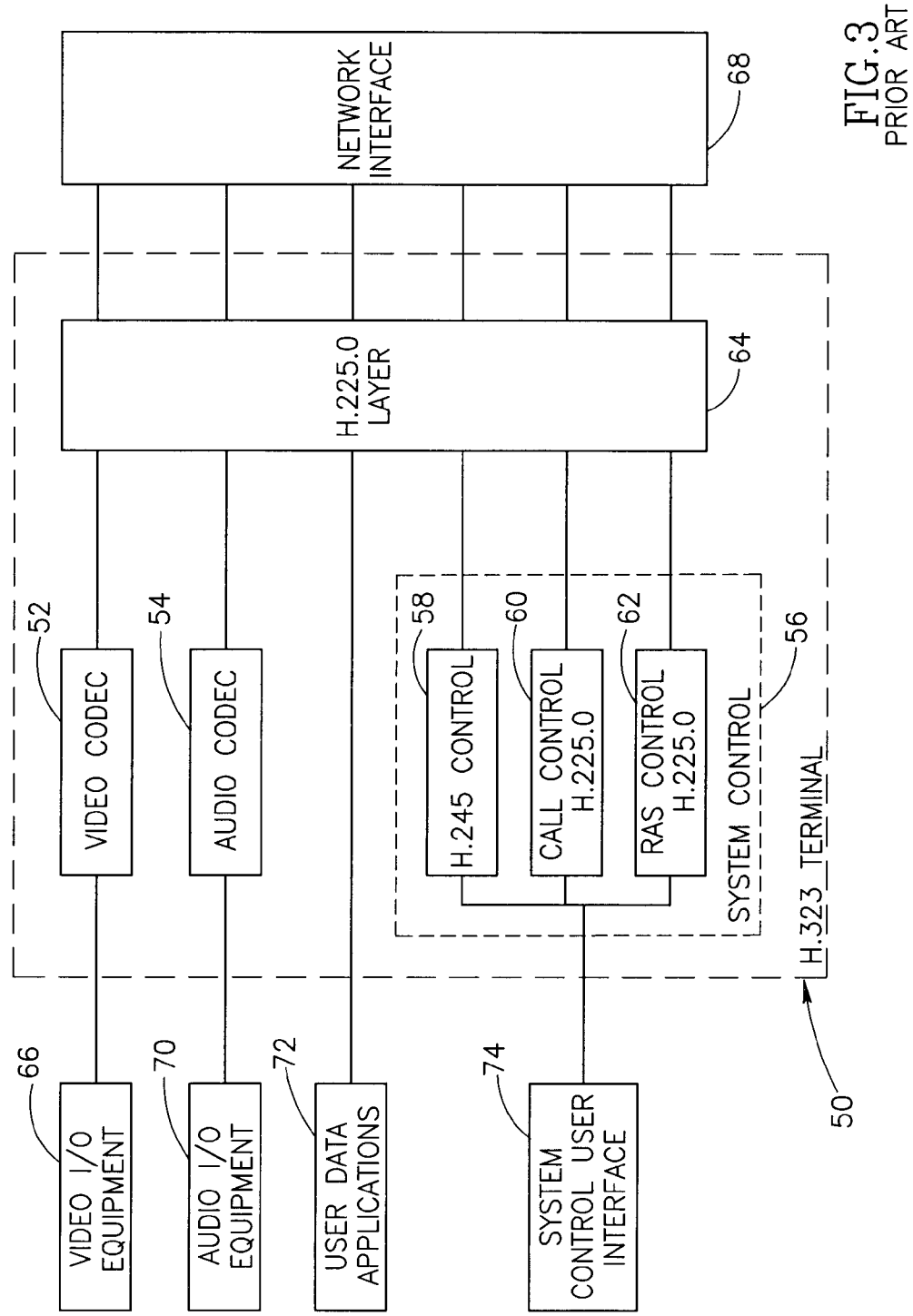
FIG. 3 is a block diagram illustrating an example prior art H.323 compliant terminal equipment.

The following notation is used throughout this document.

| Term | Definition |
|---|---|
| ACD | Automatic Call Distribution |
| ATM | Asynchronous Transfer Mode |
| CO | Central Office |
| DNS | Domain Name Server |
| DSP | Digital Signal Processing |
| FIR | Finite Impulse Response |
| IETF | Internet Engineering Task Force |
| IP | Internet Protocol |
| RFC | Request For Comment |
| ISDN | Integrated Services Digital Network |
| ITU | International Telecommunications Union |
| LAN | Local Area Network |
| MAC | Media Access Control |
| MCU | Multipoint Control Network |
| OC | Optical Carrier |
| PBX | Private Branch Exchange |
| PC | Personal Computer |
| PSTN | Public Switched Telephone Network |
| QoS | Quality of Service |
| RAS | Registration, Admission and Status |
| RFC | Request for Comment |
| RSVP | Resource Reservation Protocol |
| RTCP | Real-Time Transport Control Protocol |
| RTP | Real-Time Transport Protocol |
| SCN | Switched Circuit Network |
| SIP | Session Initiation Protocol |
| TCP | Transmission Control Protocol |
| TSAP | Transport layer Access Service Point |
| UDP | User Datagram Protocol |
| WAN | Wide Area Network |

Definitions Used Throughout

The following definitions are used throughout this document.

| Term | Definition |
|---|---|
| Call | Point to point multimedia connection between two H.323 endpoints. The call begins with the call setup procedure and ends with the call termination procedure. |
| Call signaling channel | Reliable channel used to convey the call setup and teardown messages between two H.323 entities. |
| Channel | A channel is a uni-directional link between two endpoints. |
| End System | An application that generates the content to be sent in RTP packets and/or consumes the content of received RTP packets. |
| Endpoint | An H.323 terminal, gateway or MCU. An endpoint can call and be called, it generates and/or terminates information streams. |
| Gatekeeper | An H.323 entity on the network that provides address translation and controls access to the network for H.323 terminals, gateways and MCUs. |
| Gateway | An endpoint on the network that provides for real-time, two-way communications between H.323 terminals on the packet based network and other ITU terminals (e.g., ISDN, ATM, etc.) on a switched circuit network. |
| H.323 entity | Any H.323 component including terminals, gateways, gatekeepers, MPs, MCs and MCUs. |
| Port | The abstraction that transport protocols use to distinguish among multiple destinations within a given host computer. RTP depends upon the lower layer protocols to provide some mechanism such as ports to multiplex the RTP and RTCP packets of a session. |
| RTCP Packet | A control packet consisting of a fixed header similar to that of RTP data packets, followed by structured elements that vary depending upon the RTCP packet type. Typically, multiple RTCP packets are sent together as a compound RTCP packet in a single packet of the underlying protocol using the length field in the fixed header of each RTCP packet. |
| RTP Packet | A data packet consisting of the fixed RTP header, a possibly empty list of contributing sources and the payload data. |
| RTP Payload | The data transported by RTP in a packet, for example audio samples or compressed video data. |
| RTP Session | For each participant, the session is defined by a pair of destination Transport Addresses (one Network Address plus a TSAP identifier pair for RTP and RTCP). The destination Transport Address may be common for all participants or may be different for each. In a multimedia session, the media audio and video are carried in separate RTP sessions with their own RTCP packets. The multiple RTP sessions are distinguished by different Transport Addresses. |
| Switched Circuit Network | A public or private switched telecommunication network such as the PSTN, ISDN, etc. |
| Terminal | An H.323 terminal is an endpoint on the network which provides for real-time, two-way communications with another H.323 terminal, gateway or MCU. |
| Transport Address | The transport layer address of an addressable H.323 entity as defined by the network protocol suite in use. The Transport Address of an H.323 entity is composed of the Network plus the TSAP identifier of the addressable H.323 entity. |
| TSAP Identifier | The piece of information used to multiplex several transport connections of the same type on a single H.323 entity with all transport connections sharing the same Network Address (e.g., the port number in a TCP/UDP/IP environment). TSAP identifiers may be assigned statically by an external authority or assigned dynamically during the setup of a call. |
| Zone | The collection of all terminals, gateways and MCUs managed by a single gatekeeper. A zone includes at least one terminal and may or may not include gateways or MCUs. A zone has one and only one gatekeeper. |

DESCRIPTION OF THE INVENTION

For illustration purposes, the apparatus and method of the present invention are presented in the context of a LAN telephony network operating under the ITU-T H.323 suite of protocols. The H.323 group of protocols is used to transfer multimedia information, e.g., voice, facsimile, video, data, etc., over IP networks. Note, however, that it is intended that the scope of the present invention not be limited to the examples and applications presented herein, as the invention may be applied to numerous other environments, protocols and networks as well. In particular, the apparatus and method of the present invention may be applied in systems running the Session Initiation Protocol (SIP) proposed by the Internet Engineering Task Force (IETF).

Figure 4:
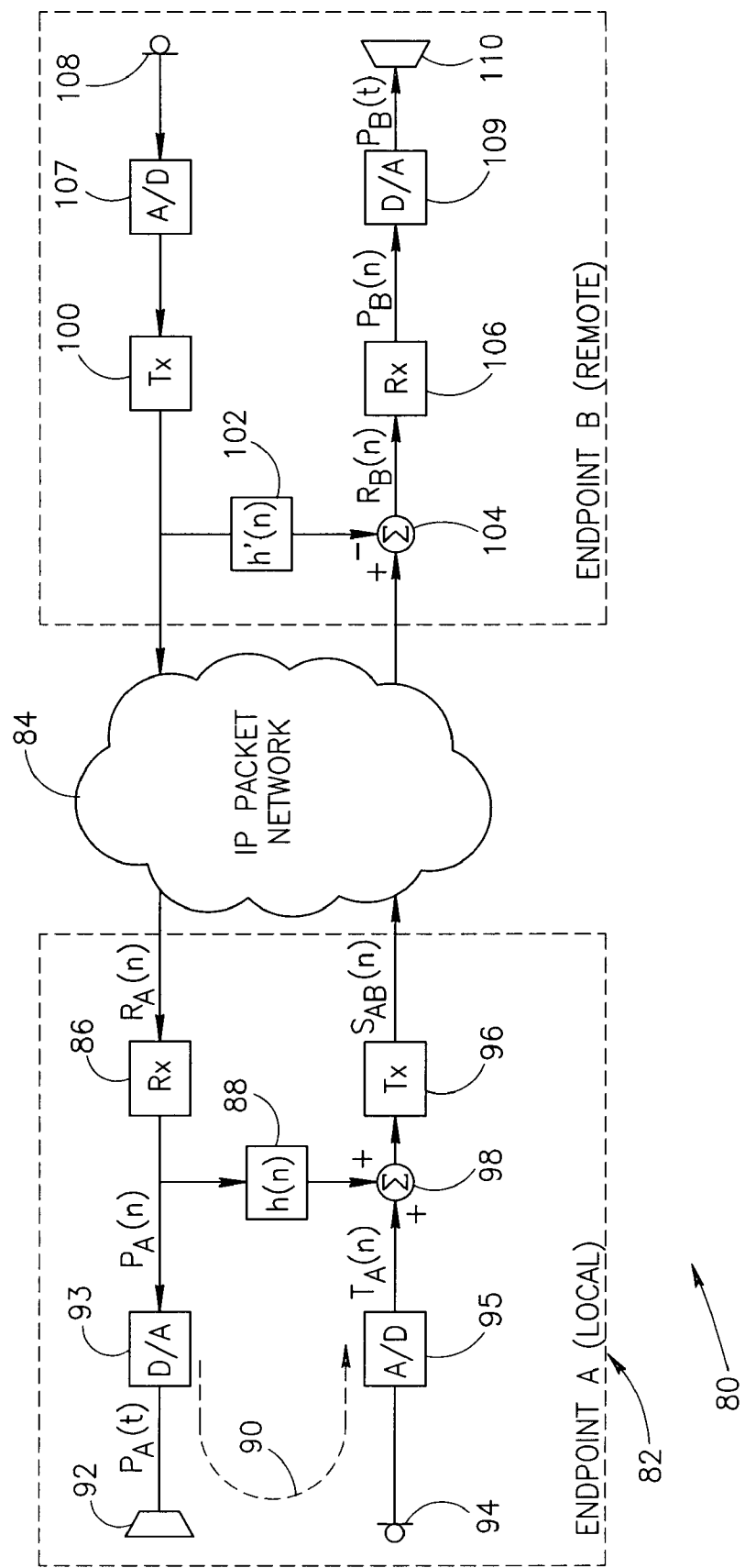
FIG. 4 is a block diagram illustrating an example voice over packet network incorporating the remote echo cancellation method and apparatus of the present invention.

A block diagram illustrating an example voice over packet network incorporating the remote echo cancellation method and apparatus of the present invention is shown in FIG. 4. The system, generally referenced 80, comprises two endpoints 82, labeled endpoint A and endpoint B. For illustration purposes, endpoint A is referred to as the local endpoint and endpoint B is referred to as the remote endpoint. Both endpoints are adapted to transmit and receive voice data over a packet network 84. Endpoint A comprises a receive circuit 86 and D/A converter 93 coupled to a speaker 92. A microphone 94 captures the analog voice that is digitized by A/D converter 95. The echo including the delay effect of the jitter buffer in endpoint A is modeled as h(n) 88 and includes all the possible sources of echo including the echo represented by dashed arrow 90. The echo is added to the recorded signal before being packetized by the transmit circuit 96 and sent over the network. The remote endpoint (endpoint B) comprises a microphone 108, A/D converter 107, transmit circuit 100, receive circuit 106, D/A converter 109 and speaker 110 similar to that of endpoint A.

Figure 5:
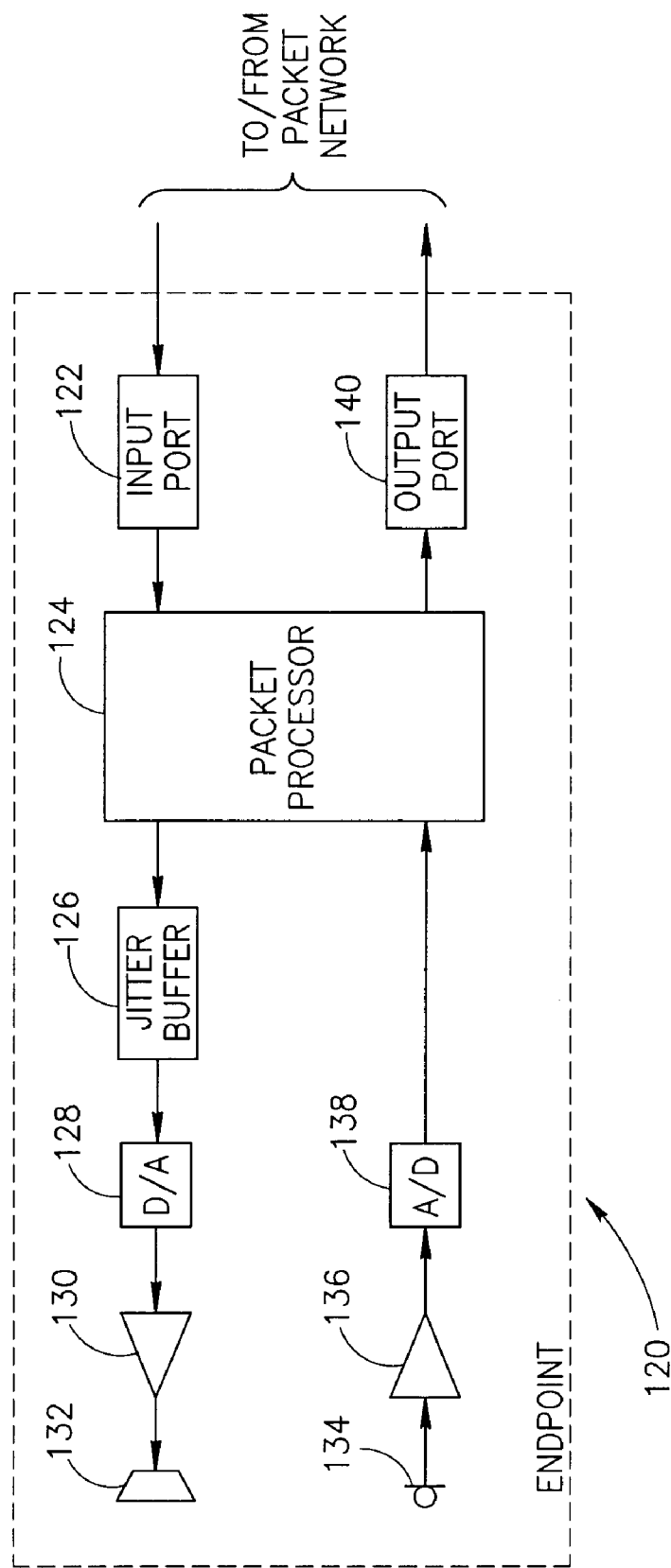
FIG. 5 is a block diagram illustrating the structure of an endpoint of FIG. 4 in more detail.

A block diagram illustrating the structure of an endpoint of FIG. 4 in more detail is shown in FIG. 5. Each endpoint, generally referenced 120, comprises an input port 122, output port 140, packet processor 124, jitter buffer 126, D/A converter 128, amplifier and analog interface circuitry 130, microphone 134, analog amplifier circuit 136 and A/D converter 138. In addition, endpoint B comprises echo estimation and cancellation circuitry for both transmit and receive channels.

The typical sampling rate for voice is 8 kHz at 8 bits/sample yielding a bit rate of 64 kbps. Thus, every 125 microseconds, a sample is taken from the microphone and a received sample is played.

As described previously, the jitter buffer 126 functions to compensate for the random arrival times of packets over the packet network. In most networks, packets arrive at the jitter buffer in an indeterministic manner due to the delay of the network. This is notwithstanding the fact that the packets are placed onto the network in a synchronous manner. The indeterministic nature of the network will not be noticed as long as the jitter buffer does not underflow or overflow. The jitter buffer is typically designed to hold approximately 100 ms of audio. A longer jitter buffer may cause a noticeable voice delay to users.

As long as packets arrive quickly enough such that the jitter buffer does not underflow, the user will hear continuous sound. If the jitter buffer underflows, what the receiver does is dependent on the policy established. For example, the endpoint can replay the last packet received (or individual samples therefrom) or may insert a period of silence. If the underflow persists, a period of silence is played.

Remote Echo Cancellation

In accordance with the present invention, the remote endpoint of the connection is adapted to perform the echo cancellation for the local endpoint. This relieves the local endpoint of incorporating the necessarily powerful and costly processor resources to perform the echo cancellation algorithms.

With reference to FIG. 4, echo generated by endpoint A is modeled by the function h'(n) 102. The estimated echo is subtracted from the received signal by subtractor 104 and the resulting signal is input to the receive circuit 106.

For reference purposes, the following signals are defined. Note that signals having an index 'n' are signals in the discrete time plane, i.e. digital signals. A signal comprises a vector of samples. Signals having an index 't' are signals in the continuous time plane, i.e., analog signals.

$T_A(n)$: the signal generated by the A/D converter 95 on endpoint A (a clean signal without an echo).

$T_B(n)$: the signal generated by the transmit circuit 100 on endpoint B.

$R_A(n)$: the signal input to the receive circuit 86 on endpoint A.

$R_B(n)$: the signal input to the receive circuit 106 on endpoint B.

$P_A(n)$: the signal to be played before being fed to the D/A converter on endpoint A.

$P_B(n)$: the signal to be played before being fed to the D/A converter on endpoint B.

$P_A(t)$: the signal played (i.e. output) through the speaker 92 on endpoint A.

$P_B(t)$: the signal played through the speaker 110 on endpoint B.

$S_{AB}(n)$: the recorded signal including the echo before being fed to the transmit circuit 96 on endpoint A (it is also the signal sent to the network).

The signal output by endpoint A onto the packet network can be expressed as follows in Equation 1.

$$S_{AH}(n)=T_A(n)+R_A(n)*h(n) \tag{1}$$

wherein '*' represents convolution. This expression is valid, however, only in to case where the signal received is identical to the signal played. In a packet telephony system, this may not be the case. As described above, in the event packets are delayed or lost due to network congestion, and the jitter buffer underflows, the receive circuit is adapted to either replay the last received packet or to insert a period of silence. Thus, the signal received $R_A(n)$ is not the same as the signal played $P_A(n)$. A more accurate expression for the signal transmitted by endpoint A is $$S_{AH}(n)=T_A(n)+P_A(n)*h(n) \tag{2}$$

Where the signal played is convolved with the echo transfer function. The result is added to the transmit signal derived from the voice samples.

Without the benefit of the present invention, endpoint A would be required to remove the echo by estimating the echo transfer function and convolving it with the played signal. The resulting estimated echo signal is subtracted from the transmitted signal as expressed below in Equation 3.

$$S_{AB}(n)=T_A(n)+P_A(n)*h(t)-P_A(n)*h'(n) \tag{3}$$

The quality of the echo cancellation depends on how close the estimate of h'(n) is to h(n). With the benefit of the present invention, however, the endpoint at the remote end of the connection is adapted to perform the echo cancellation for the local endpoint. Thus, on the remote side, endpoint B is adapted to generate h'(n) 102 which represents an estimate of the echo transfer function h(n) on the local endpoint (i.e. endpoint A).

The signal input to the receiver in endpoint B can be expressed as $$R_B(n)=S_{AB}(n)-P_A(n)*h'(n)=T_A(n)+P_A(n)*h(n)-P_A(n)*h'(n) \tag{4}$$

Thus, in order to remove the echo, endpoint B must have knowledge of the signal $P_A(n)$ that is played by endpoint A. The present invention provides an apparatus and a method that enables endpoint B to generate an estimate to the signal $P_A(n)$ that is played by endpoint A.

Figure 6A:
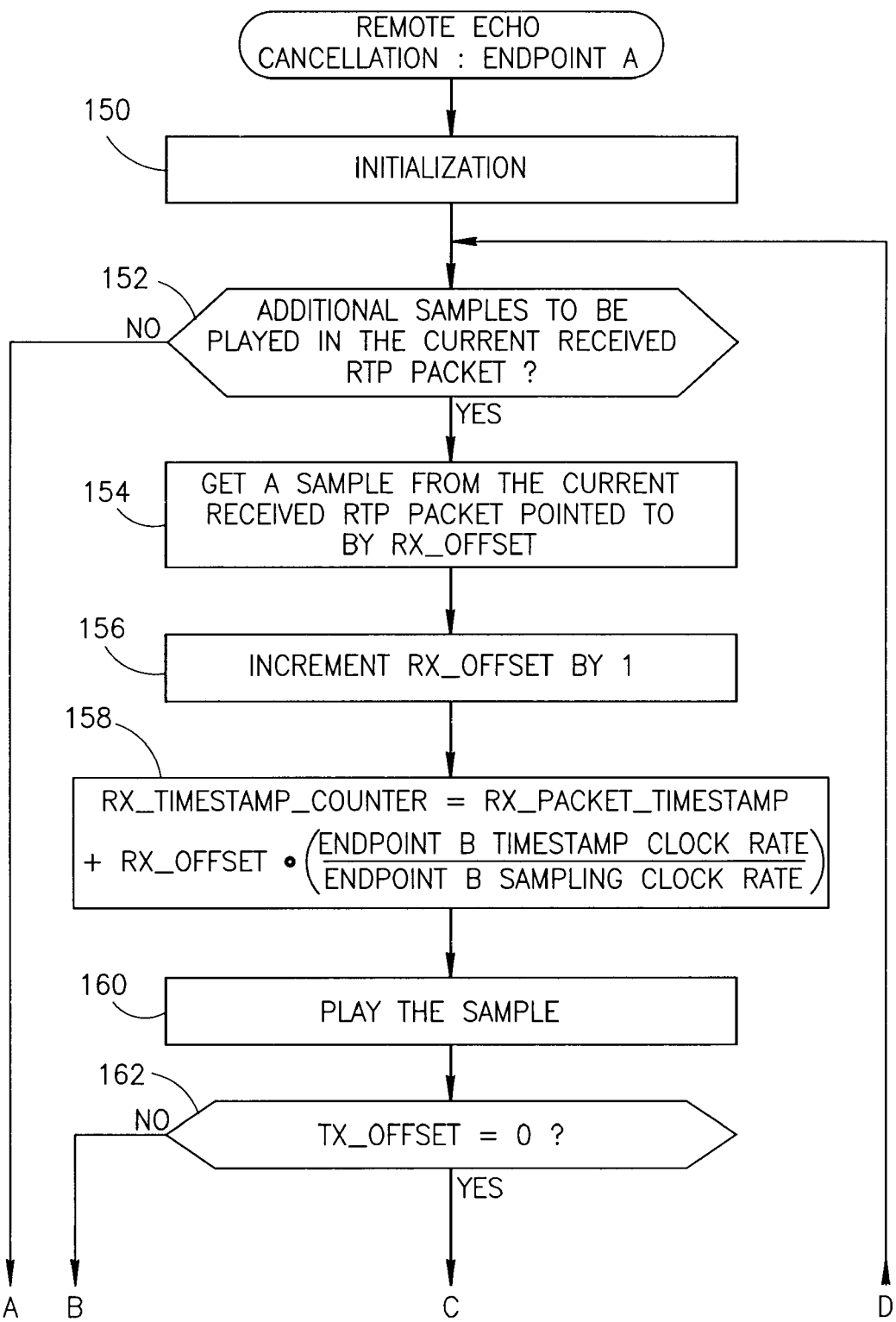
FIGS. 6A, 6B and 6C are a flow diagram illustrating the remote echo cancellation method of the present invention performed on the local side of a connection.
Figure 6B:
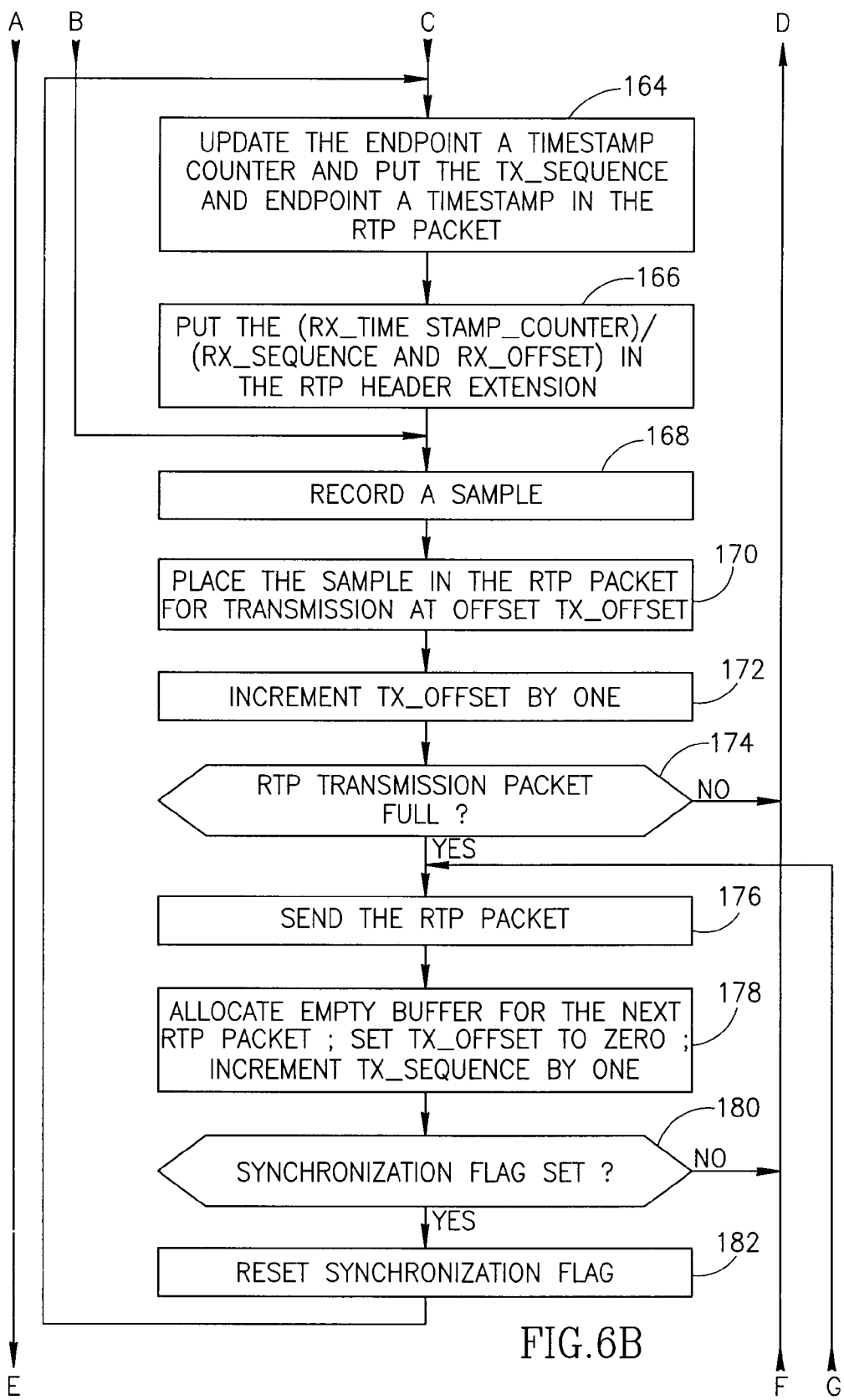
Figure 6C:
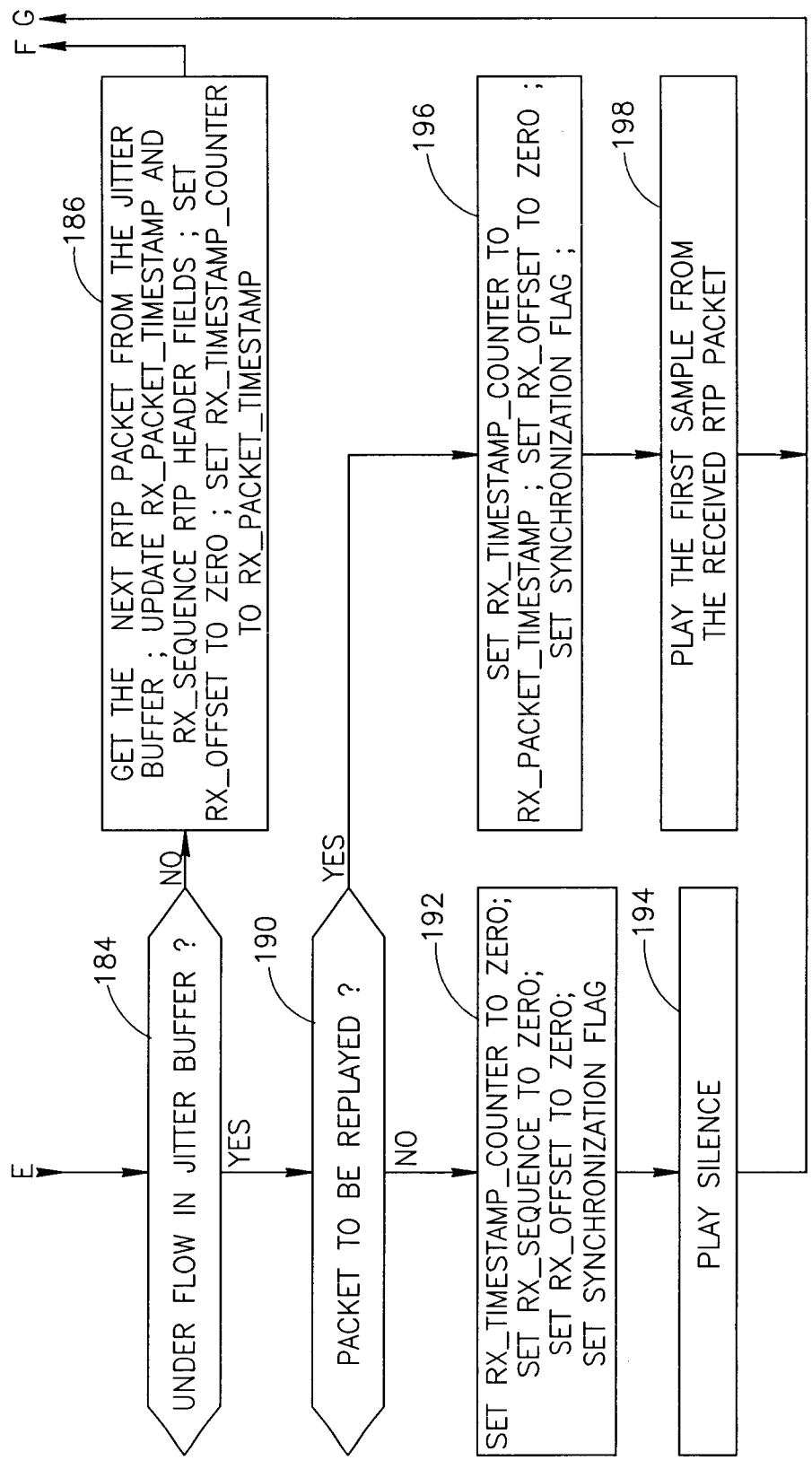

A flow diagram illustrating the remote echo cancellation method of the present invention performed on the local side of a connection is shown in FIGS. 6A, 6B and 6C. The method is described in the context of the example packet telephony system of FIG. 4. Note, however, that one skilled in the art can apply the principles of the present invention to other systems and networks as well.

After the connection between the two endpoints is set up, endpoint A initializes all its internal circuitry used for transmit and receive operations (step 150). In particular, the transmit and receive channel variables are initialized. The hardware counters rx_offset pointer relating to the received packet that is played and the tx_offset pointer relating to the packet generated from samples are reset to zero. The synchronization flag is reset to zero and the rx_packet_timestamp and rx_sequence variables are loaded from the header of the first received RTP packet.

The transmit circuitry of endpoint A begins operating and the receive circuitry plays silence until the first RTP packet from endpoint B is received. When the first RTP packet is received, its sequence number is extracted from its header and saved in the rx_sequence variable and endpoint B timestamp is extracted from the RTP packet header and saved in the variable rx_packet_timestamp.

If there are unplayed samples in the current received RTP packet (step 152) then the sample pointed to by rx_offset is extracted from the RTP packet payload (step 154) and rx_offset is incremented to point to the next sample (step 156). The endpoint B timestamp associated with the extracted sample is calculated (step 158) using the following linear extrapolation $$rx\_timestamp\_counter = rx\_packet\_timestamp + \qquad (5)$$
$$rx\_offset \times \left( \frac{endpoint\ B\ timestamp\ clock\ rate}{endpoint\ B\ sampling\ clock\ rate} \right)$$

where the rx_timestamp_counter is the value that is written to the header extension. If the timestamp and sampling clock rates are the same, than the fraction reduces to one. If, however, they are different the rx_offset is adjusted accordingly. The sample is then input to the A/D converter 93 (FIG. 4) in endpoint A and played through the corresponding loudspeaker 92 (step 160).

If the tx_offset pointer points to the beginning of the RTP packet endpoint A is currently building for transmission to endpoint B (i.e. tx_offset=0) (step 162), then the packet is a new RTP packet and the packet processor must build the RTP packet header (step 164). The timestamp counter of endpoint A is updated and placed in the RTP header. In addition, the tx_sequence number of endpoint A is placed in the RTP packet header as well (step 164). If the timestamp method is used then the rx_timestamp_counter is placed in the RTP header extension (step 166). If the sequence method is used then rx_sequence and rx_offset are placed in the RTP header extension (step 166).

A sample is recorded using the microphone 94 (FIG. 4) and the A/D converter 95 (step 168) and the sample is appended to the RTP packet payload at a position pointed to by tx_offset (step 170). The tx_offset is then incremented by one (step 172).

It is then checked whether the RTP packet being built is full (step 174). If it is not full, then it is checked whether there are additional samples to be played (step 152). If the RTP packet is full (step 174), then the packet processor sends the packet (step 176) and an empty buffer is allocated for the next RTP packet to be built (step 178). In addition, the tx_offset is set to zero and tx_sequence is incremented by one. If the synchronization flag is not set (step 180), the method continues with step 152. Otherwise, the synchronization flag is reset (step 182) and the method continues with step 164.

If there are no additional unplayed samples in the current received RTP packet (step 152), then the packet processor checks if there is a packet pending in the jitter buffer (step 184). If a packet is found in the jitter buffer, the packet processor retrieves it and extracts the endpoint B timestamp and stores it in rx_packet_timestamp. In addition, the sequence number is extracted from the RTP packet header and saved in rx_sequence. The rx_offset is reset to zero, rx_timestamp_counter is set to rx_packet_timestamp and control passes to step 152 (step 186).

If an underflow occurs in the jitter buffer in endpoint A (step 184) then either the last packet is replayed or a silence is played. Typically, in the event of a jitter buffer underflow, the last RTP packet is replayed. If the underflow persists, a silence is then played. In either case, an indication is sent in the packet to endpoint B indicating that a packet was replayed or a silence was played.

If the packet is replayed (step 190), then rx_timestamp_counter is set to the value of rx_packet_timestamp, rx_offset is set to zero and the synchronization flag is set (step 196). These values are placed in the RTP header extensions. The first sample from the received RTP packet is then replayed (step 198). The method continues with step 176.

If the a silence is played, then rx_timestamp_counter, rx_sequence and rx_offset variables are all set to zero and the synchronization flag is set (step 192). These values are updated to reflect the fact that a silence was played. These values are then placed in the RTP header extension. A silence is then played (step 194). The method continues with step 176.

A complementary process running on endpoint B is operative to detect a nonlinear change in the timestamp increment or a nonsequential sequence number (depending on whether the timestamp or sequence indication method is used) and to determine what was actually played.

In the event the last packet(s) (or samples) is replayed or a silence is played, the RTP packet that endpoint A is currently filling is sent immediately regardless of whether the payload portion of the packet has been completely filled (step 176) and the processor circuitry starts filling a new RTP packet (steps 178, 180, 182). Note that in an alternative embodiment, it is checked if silence is played more then once, and if so, the endpoint plays a silence after performing step 190 and then goes to step 162 rather than to step 192. Note that alternatively, other types of indications beside the timestamp and sequence methods may be used without departing from the scope of the present invention.

Figure 7:
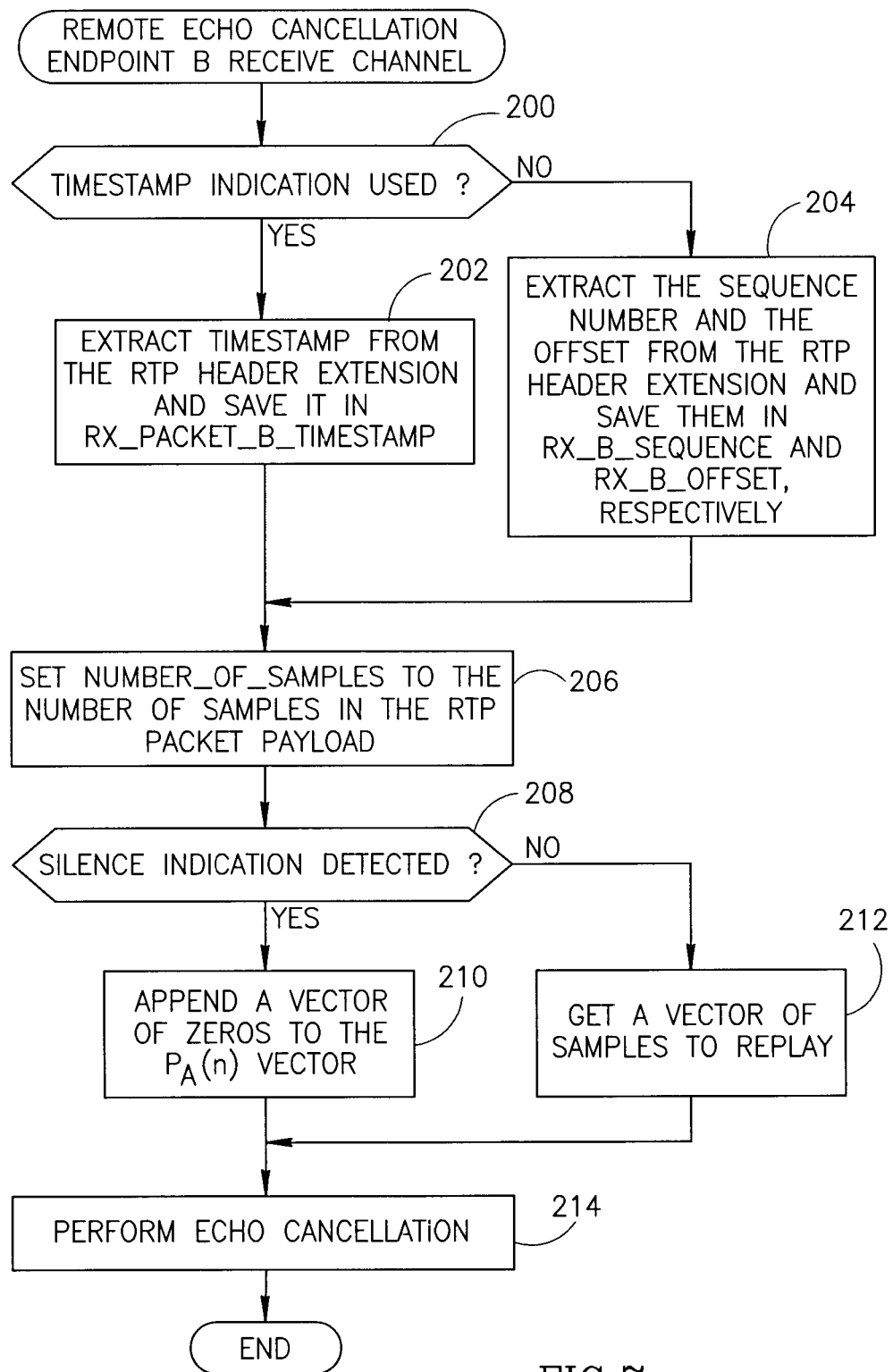
FIG. 7 is a flow diagram illustrating the remote echo cancellation method of the present invention performed on the remote echo cancellation side of a connection.

A flow diagram illustrating the remote echo cancellation method of the present invention performed on the remote echo cancellation side of a connection is shown in FIG. 7. Either the timestamp or the sequence number and offset (depending which indication method is used) is extracted from the header extension portion of the RTP packets received from the local endpoint (endpoint A). In particular, if the timestamp indication is used (step 200), then the timestamp is extracted from the RTP header extension and saved in rx_packet_$_B$_timestamp (step 202). If the sequence number and offset indication is used (step 200), then the sequence number and offset are extracted from the RTP header extension and saved in rx_B_sequence and rx_B_offset, respectively (step 204).

The number of samples in the RTP packet is then calculated (step 206). In particular, the number_of_samples is set to the payload size of the RTP packet divided by the sample size. It is then determined whether a silence was played (step 208). A silence was played if the rx_packet_$_B$_timestamp equals zero (timestamp indication used) OR rx_B_sequence equals zero (sequence number indication used). If a silence was played (step 208), then a vector of zeros having a length equal to number_of_samples is appended to the reconstructed $P_A(n)$ vector (step 210).

If the extracted timestamp or sequence number (depending on the indication method) is not zero (step 208), then the timestamp or sequence number/offset is a pointer to the sample that was played by endpoint A when the first sample in the RTP packet was recorded. If the timestamp indication was used, a vector of sequential samples having a length equal to the number_of_samples, whose first sample, associated with the timestamp rx_packet_$B$_timestamp, is extracted and appended to reconstructed $P_A(n)$ vector (step 212). If the sequence number/offset indication was used, the sequence number rx_$_1$ $_B$_sequence and the offset within the packet rx_B_offset are the pointers to the first sample of the appended vector.

Note that since the remote endpoint now knows precisely which sample was played when the first sample in the packet was recorded by endpoint A, it also knows whether the jitter buffer in endpoint A underflowed and whether endpoint A has replayed any packets or samples. The remote endpoint also knows that if the received RTP packet contains N samples, then endpoint A played N sequential samples beginning with the first played sample during the recording of those N samples. This is true because the endpoint sends the current RTP packet even if it is not full and begins filling a newly allocated packet when the stream of played samples becomes non-sequential (see steps 196, 198, etc.)

Endpoint B has knowledge of the timing and the contents of the particular packet that was played by endpoint A at a point in time corresponding to the generation of the data samples by endpoint A since the sampling rate and timing are known and since the packets recently sent to endpoint A are stored by endpoint B. Assuming endpoint B has an estimate of the echo function on the local endpoint, endpoint B can now perform echo cancellation using its knowledge of the data samples played on endpoint A (step 214).

Thus, the present invention enables an entity other than the local endpoint to perform echo cancellation. The entity may comprise the remote endpoint or may comprise a third party entity that does not generate or play audio but is adapted to provide one or more services to either or both endpoints, for example, a third party entity may be adapted to perform echo cancellation for the local endpoint, the remote endpoint or both. In this case, RTP packets generated in accordance with the invention are generated and sent to the third party for processing. The results are forwarded to the appropriate entity, i.e. the remote endpoint for playing.

If packets from endpoint A (i.e. the local endpoint) are lost on their way to endpoint B (i.e. the remote endpoint), endpoint B replays the most recently packet received from endpoint A. Thus, the action taken with lost packets is similar on both ends of the connection.

Note that this assumes that the sample rate for the data samples from endpoint B is known by endpoint A. The sampling rate for each endpoint may be different as long as both sides of the connection know the other's sampling rate.

Note that this also assumes that the timestamp clock rate of each endpoint is known to the other endpoint. The timestamp clock rate for each endpoint may be different as long as both sides of the connection know the timestamp clock rate of the other.

Note also that although endpoint A inserts into the RTP packet all the data and indications required for endpoint B to reconstruct exactly what endpoint A has played, some of those RTP packets might get lost by the network since they are transported using the unreliable UDP protocol. In this case, there is no need to perform echo cancellation on the samples in those RTP packets that get lost since those packets would not be played at endpoint B. The indications of what was played on endpoint A, however, are important for doing echo cancellation for RTP packets that reach endpoint B following the one or more RTP packets that were dropped.

When performing echo cancellation for the first RTP packet that arrives after one or more packets are dropped, endpoint B can either guess what was played and/or use a shorter Finite Impulse Response (FIR) digital filter for filtering out the echo. Note that even though delayed RTP packets may arrive too late to be played by endpoint B, the indication within those RTP packets representing what endpoint A has played are still useful and should be used by endpoint B for reconstructing what endpoint A has played.

In addition, the present invention may be applied to protocols other than H.323 such as the Session Initiation Protocol (SIP) proposed by the Internet Engineering Task Force (IETF). The SIP is an application-layer control/signaling protocol for creating, modifying and terminating sessions with one or more participants. The sessions include Internet multimedia conferences, Internet telephone calls and multimedia distribution. The protocol provides for both unicast and multicast messages. Similar to H.323, SIP is designed to be independent of the lower layer transport protocol and can be extended with additional capabilities.

Note that in an alternative embodiment, rather than use the timestamp in the RTP packet, the invention may utilize sequence numbers combined with the receive sample offset within the RTP packet to uniquely identify a sample that was played.

Note that the timestamp clock used in each of the endpoints may or may not be equal to the data sampling rate, If the timestamp rate is greater than the data sampling rate, than each sample has a unique timestamp. If, however, the timestamp rate is less than the data sampling rate, than several samples have the same timestamp and cannot be uniquely identified. Preferably, to achieve optimal echo cancellation results, the timestamp clock rate should be greater than or equal to the data sampling rate.

In the event the RTP packets are compressed, the endpoints must be adapted to decompress them before performing the method of the present invention. All references (i.e. pointers) are to uncompressed samples.

Note that some endpoints, when they detect that their end user is silent, send an RTP packet to the remote endpoint with an indication that their user is silent and then stop sending packets until their user starts to speak again. If endpoint B is such an endpoint, then when endpoint A encounters the indication from endpoint B that user B is silent, it should operate as if there is jitter buffer underflow and should play either silence or other soft, comfortable noise towards end user A.

The indication placed in the RTP packet extension should indicate that a silence or comfort noise was played. The comfort noise is a weak noise meant to give the end user (user A in this case) the feeling that the connection is alive and that the remote user is still connected although silent. Since the played noise is weak, and the returned echo is weaker then the original sound, the noise that is added to the recoded sound (as an echo) is weak and endpoint B can either use a noise filter to reduce it or simply ignore it and play endpoint A's sample sent to user B without performing echo cancellation.

It is intended that the appended claims cover all such features and advantages of the invention that fall within the spirit and scope of the present invention. As numerous modifications and changes will readily occur to those skilled in the art, it is intended that the invention not be limited to the limited number of embodiments described herein. Accordingly, it will be appreciated that all suitable variations, modifications and equivalents may be resorted to, falling within the spirit and scope of the present invention.

What is claimed is:

1. A method of performing echo cancellation on a remote device in a packet telephony system, said system supporting a connection between a first endpoint and a second endpoint, said method comprising the steps of:

tracking a second timestamp of data samples originating from said second endpoint that are played by said first endpoint;

generating data samples on said first endpoint at a first data sample clock rate;

sending to said remote device packets containing data samples generated by said first endpoint, a first timestamp corresponding thereto and the second timestamp of data samples from said second endpoint played by said first endpoint at that moment in time, wherein said first timestamp is generated at a first timestamp clock rate;

placing an indication in the packet of data samples sent to said remote device, said indication operative to specify whether a packet, several packets, several sequential samples from the same packet or several sequential samples from different packets received by said first endpoint were replayed or that a silence was played;

tracking the number of data samples in the packets received by said remote device; and reconstructing on said remote device the signal played on said first endpoint using said first timestamp, said second timestamp, said number of samples in the packet, and said indication information and performing echo cancellation therewith.

2. The method according to claim 1, wherein said remote device comprises said second endpoint.

3. The method according to claim 1, wherein said remote device adapted to perform echo cancellation for said first endpoint, said second endpoint or both.

4. The method according to claim 1, wherein said packets comprise Real-Time Transport Protocol (RTP) packets.

5. The method according to claim 1, wherein said packet telephony system is constructed in accordance with the International Telecommunications Union (ITU) H.323 protocols.

6. The method according to claim 1, wherein said packet telephony system is constructed in accordance with the Internet Engineering Task Force (IETF) Session Initiation Protocol (SIP).

7. The method according to claim 1, wherein said step of performing echo cancellation comprises estimating the echo function of said first endpoint.

8. The method according to claim 1, further comprising the step of decompressing said packet of data samples wherein pointer references to data samples are to uncompressed samples.

9. The method according to claim 1, wherein said first timestamp clock rate is greater than or equal to a said first data sample clock rate.

10. The method according to claim 1, wherein said first endpoint has knowledge of the sampling rate used by said second endpoint and said second endpoint has knowledge of the sampling rate used by said first endpoint.

11. The method according to claim 1, wherein said first timestamp and said second timestamp comprise a packet sequence number and a sample offset within said packet.

12. An apparatus for performing echo cancellation on a remote device in a packet telephony system, said system supporting a connection between a first endpoint and a second endpoint, comprising:

means for tracking a second timestamp of data samples originating from said second endpoint that are played by said first endpoint;

means for generating data samples on said first endpoint at a first data sample clock rate;

means for sending to said remote device packets containing data samples generated by said first endpoint, a first timestamp corresponding thereto and the second timestamp of data samples from said second endpoint played by said first endpoint at that moment in time, wherein said first timestamp is generated at a first timestamp clock rate;

means for placing an indication in the packet of data samples sent to said remote device, said indication operative to specify whether a packets, several packet, several sequential samples from the same packet or several sequential samples from different packets received by said first endpoint were replayed or that a silence was played;

means for tracking the number of data samples in the packets received by said remote device; and means for reconstructing on said remote device the signal played on said first endpoint using said first timestamp, said second timestamp, said number of samples in the packet, and said indication information and performing echo cancellation therewith.

13. The apparatus according to claim 12, wherein said remote device comprises said second endpoint.

14. The apparatus according to claim 12, wherein said remote device adapted to perform echo cancellation for said first endpoint, said second endpoint or both.

15. The apparatus according to claim 12, wherein said packets comprise Real-Time Transport Protocol (RTP) packets.

16. The apparatus according to claim 12, wherein said packet telephony system is constructed in accordance with the International Telecommunications Union (ITU) H.323 protocols.

17. The apparatus according to claim 12, wherein said packet telephony system is constructed in accordance with the Internet Engineering Task Force (IETF) Session Initiation Protocol (SIP).

18. The apparatus according to claim 12, wherein means for performing echo cancellation comprises means for estimating the echo function of said first endpoint.

19. The apparatus according to claim 12, further comprising means for decompressing said packet of data samples wherein pointer references to data samples are to uncompressed samples.

20. The apparatus according to claim 12, wherein said first timestamp clock rate is greater than or equal to said first data sample clock rate.

21. The apparatus according to claim 12, wherein said first endpoint has knowledge of the sampling rate used by said second endpoint and said second endpoint has knowledge of the sampling rate used by said first endpoint.

22. The apparatus according to claim 12, wherein said first timestamp and said second timestamp comprise a packet sequence number and a sample offset within said packet.

23. A method of performing echo cancellation on a remote device in a packet telephony system, said system supporting a connection between a local endpoint and a remote endpoint, said method comprising the steps of:

playing remote audio samples generated and sent by said remote endpoint, wherein each remote audio sample has a remote timestamp corresponding thereto;

sampling audio on said local endpoint and generating local audio samples and local timestamps corresponding thereto;

recording the remote timestamp associated with the remote audio sample played on said local endpoint at the time each local timestamp is generated;

forwarding said local audio samples, corresponding local timestamps and remote timestamps to said remote device; and wherein said remote device performs echo cancellation for said local endpoint in accordance with said local audio samples, corresponding local timestamps, remote timestamps and remote audio samples previously generated and stored in said remote device corresponding to said remote timestamps.

* * * * *